United States Patent [19]
Aftanas

[11] Patent Number: 6,068,169
[45] Date of Patent: May 30, 2000

[54] ARTICLE CARRIER HAVING SINGLE SIDED RELEASABLE AND REMOVABLE CROSS BAR

[75] Inventor: Jeffrey M. Aftanas, Sterling Heights, Mich.

[73] Assignee: JAC Products, Inc., Ann Arbor, Mich.

[21] Appl. No.: 09/044,653

[22] Filed: Mar. 19, 1998

[51] Int. Cl.[7] .................................................. B60R 9/045
[52] U.S. Cl. .......................................... 224/321; 224/326
[58] Field of Search .................................. 224/321, 325, 224/326, 309; 410/144, 145, 146, 147, 148, 149, 150, 139, 132, 130

[56] References Cited

U.S. PATENT DOCUMENTS

| | | |
|---|---|---|
| 4,294,388 | 10/1981 | Wiinstel . |
| 4,702,653 | 10/1987 | Gaulding et al. ........................ 410/150 |
| 5,190,198 | 3/1993 | Cucheran . |
| 5,715,980 | 2/1998 | Blankenburg et al. . |
| 5,924,614 | 7/1999 | Kuntze et al. ........................... 224/321 |

Primary Examiner—Linda J. Sholl
Attorney, Agent, or Firm—Harness, Dickey & Pierce, PLC

[57] ABSTRACT

A vehicle article carrier having a cross bar which may be locked and unlocked from a pair of side rails from a single side of the cross bar, and which may also be quickly and easily removed from the side rails without disassembly of the cross bar or the side rails. The vehicle article carrier comprises a pair of side rails and at least one adjustably positionable cross bar. The cross bar includes independent first and second components which are disposed at least partially within a sleeve of the cross bar. A single actuating lever having a camming boss extends through portions of each of the first and second components and simultaneously causes the first and second components to be retracted out of locking engagement with their respective side rails, thereby permitting the cross bar to be locked and unlocked relative to the side rails from one side of the vehicle. Moving the actuating member into a third position retracts the first and second components a further degree, thus permitting the cross bar to be completely removed from the side rails without any disassembly of the cross bar or the side rails. The cross bar is formed from a relatively few number of component parts and can be quickly and cost effectively manufactured.

18 Claims, 3 Drawing Sheets

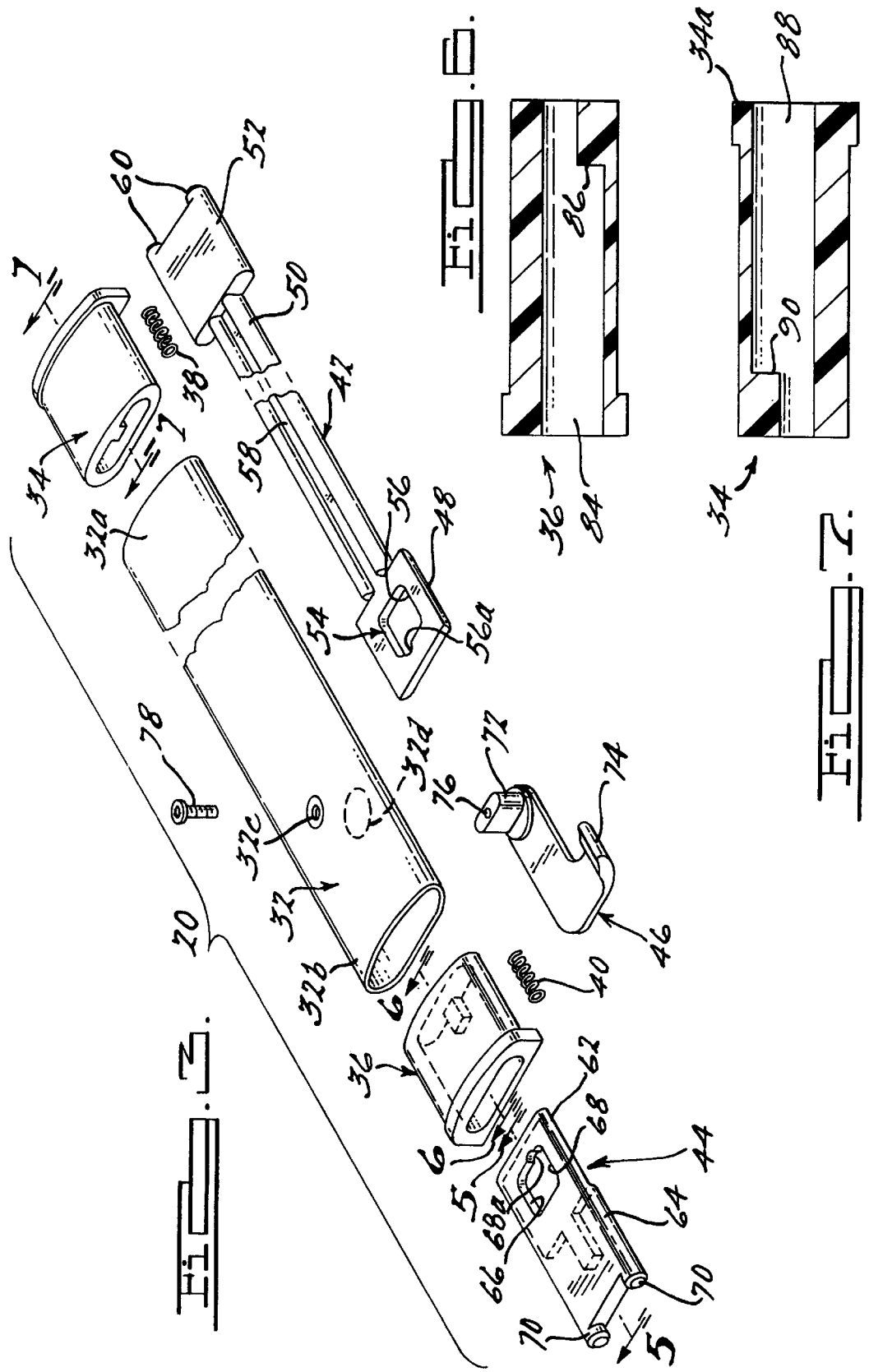

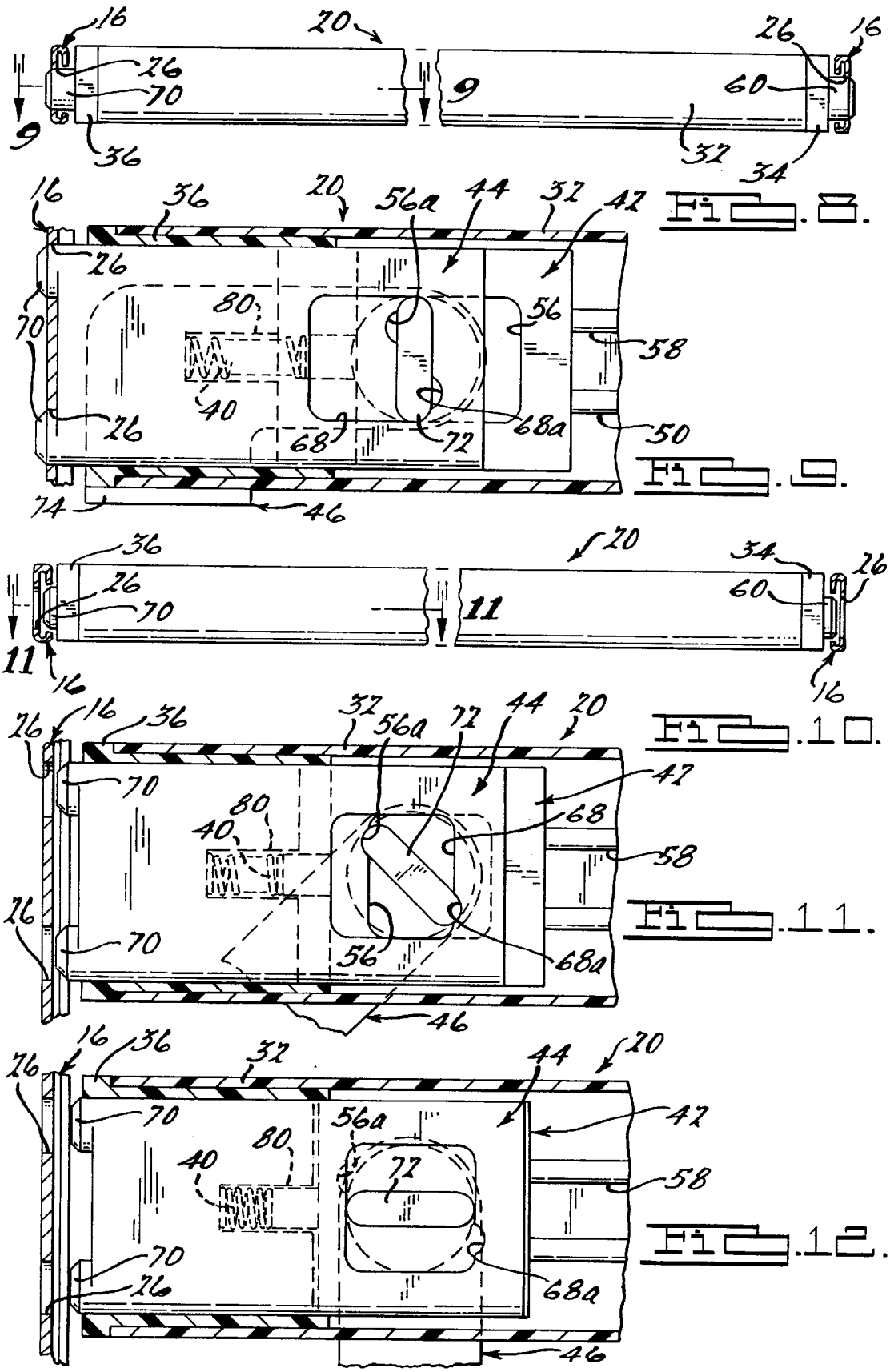

ARTICLE CARRIER HAVING SINGLE SIDED RELEASABLE AND REMOVABLE CROSS BAR

BACKGROUND OF THE INVENTION

1. Technical Field

This invention relates to vehicle article carriers, and more particularly to a vehicle article carrier having a cross bar which can be released from locking engagement with both of a pair of side rails supporting the cross bar generally simultaneously via a single actuating member, and which can further be removed from the side rails without disassembly of the cross bar or the side rails.

2. Discussion

Vehicle article carriers are used in a wide variety of applications to support variously sized articles above an outer body surface of a vehicle. Typically, such vehicle article carriers include a pair of side rails which are secured to the outer body surface of the vehicle generally parallel to one another. Usually at least one cross bar is included which extends between the side rails and which has some means at each end thereof for engaging the side rails to allow the cross bar to be suspended above the outer body surface by the side rails. If the cross bar is adjustably positionable along the siderails it will also typically incorporate some form of locking mechanism which allows it to be disengaged from the side rails such that the cross bar can be repositioned along the side rails if needed. This allows the vehicle article carrier system to be configured to support variously shaped articles thereon as may be needed.

Present day vehicle article carriers typically include at lease one adjustable cross bar having a locking mechanism at each end thereof. Most often, the user must unlock one locking mechanism at one end of the cross bar and then walk around to the opposite side of the vehicle to unlock the other locking mechanism. Only then can the cross bar be repositioned along the side rails as may be needed. In most instances the cross bar is not readily removable from the side rails without disassembly of a portion of the cross bar or the side rails, or a combination of both. However, if one does not anticipate the need for using the vehicle article carrier for a significant length of time, it would be desirable to be able to remove the cross bar from the side rails. This can help lower wind resistance when driving the vehicle and therefore contribute towards greater fuel economy, less road noise, etc.

Various attempts have been made to provide a cross bar having a means by which the locking mechanisms at each end of the cross bar can be simultaneously locked and unlocked from one end of the cross bar. Such attempts involve the apparatus disclosed in U.S. Pat. No. 5,190,198, available from the assignee of the present application, the disclosure of which is hereby incorporated by reference. While the apparatus disclosed in this patent has proven to be a useful and successful product, it nevertheless is somewhat complicated to manufacture in view of the number of independent component parts incorporated.

Accordingly, it would be highly desirable to provide a cross bar for a vehicle article carrier which incorporates locking mechanisms at each end thereof which may be simultaneously moved out of locking engagement with a pair of side rails supporting the cross bar from one side of the cross bar, and further via a single actuating member. It would further be highly desirable if such a cross bar could be readily removed from the side rails when in the unlocked position. This would enable the cross bar to be quickly and easily removed without disassembly of any portion thereof and without disassembly of the side rails when it is expected that the vehicle article carrier will not be used for some prolonged period of time.

SUMMARY OF THE INVENTION

The above and other objects are provided by a vehicle article carrier apparatus in accordance with preferred embodiments of the present invention. In one preferred embodiment the apparatus comprises a pair of side rails which are adapted to be secured to an outer body surface of a vehicle. A cross bar having a locking assembly at each end thereof is adapted to be lockingly engaged with the side rails to support articles thereon above the outer body surface. The cross bar includes a locking member comprised of first and second components, with each being associated with one of the siderails. An actuating member is operably associated with the first and second components to cause the two components to be moved generally simultaneously out of locking engagement with their respective side rails when the actuating member is moved from a first position into a second position. When in the second position, the cross bar is unlocked from the side rails at each end and can be slidably positioned along the side rails as needed.

In the preferred embodiment described above, when the actuating member is moved from a second into a third position, the first and second components are moved even further away from their respective side rails. This permits the cross bar to be removed entirely from the side rails without the need for any disassembly of the cross bar or the side rails. Therefore, the cross bar can be easily stored away when it is expected that the vehicle article carrier apparatus will not be needed for some time.

In the preferred embodiment described above each of the first and second components comprises a camming surface and the actuating member comprises a camming boss. The camming boss is pivotally secured to an elongated sleeve portion of the cross bar. When the actuating member is moved from the first into the second position, the camming boss engages the camming surfaces of each of the first and second components, thereby causing each to move slidably within the sleeve portion such that each is moved slidably away from its associated side rail, thereby disengaging the entire cross bar from the side rails. A biasing member associated with each component provides a biasing force which tends to urge its associated component outwardly towards its associated side rail. Movement of the actuating member from the first into the second position thus causes the first and second components to be retracted against the forces of the biasing members.

In one preferred embodiment each of the side rails forms a channel having a number of openings formed therein and spaced apart longitudinally therealong. Each of the first and second components further comprises at least one protruding locking portion adapted to engage within one of the openings in its associated side rail. When the actuating member is in the first position, the biasing members urge each of the first and second components outwardly towards their respective side rails, and as soon as the protruding locking portions are moved over an opening in its associated side rail, each engages therein to positively hold the cross bar stationary along side rails.

The various preferred embodiments provide a cross bar which can not only be positively locked in a desired position along a pair of side rails, but which also permit the cross bar to be quickly and easily removed entirely from the side rails if desired. The various preferred embodiments incorporate a very limited number of independent component parts which makes manufacture and assembly of the vehicle article carrier apparatus extremely cost effective and simple.

BRIEF DESCRIPTION OF THE DRAWINGS

The various advantages of the present invention will become apparent to one skilled in the art by reading the following specification and subjoined claims and by referencing the following drawings in which:

FIG. 3 is an exploded perspective view of one of the cross bars shown in FIG. 1;

FIG. 6 is a cross sectional side view of the second sleeve end member of the cross bar as taken in accordance with section line 6—6 in FIG. 3;

FIG. 7 is a cross sectional side view of the first sleeve end member as taken in accordance with section line 7—7 in FIG. 3;

FIG. 8 is an end view of the assembled cross bar in locking engagement with the side rails;

FIG. 9 is a cross sectional view of a portion of each of the first and second components taken in accordance with section line 9—9 in FIG. 8 when the cross bar is lockingly engaged with the side rails;

FIG. 10 is an end view of the cross bar shown in FIG. 8 but with the cross bar in the unlocked position;

FIG. 11 is a cross sectional view in accordance with section line 11—11 in FIG. 10 of a portion of the cross bar illustrating the first and second components in the orientation they assume when the actuating member is in the unlocked position; and FIG. 12 is a view of the first and second components shown in FIG. 11 with the actuating member rotated fully 90° into the position enabling the cross bar to be completely removed from the side rails.

DETAILED DESCRIPTION OF THE PREFERRED EMBODIMENTS

Figure 1:
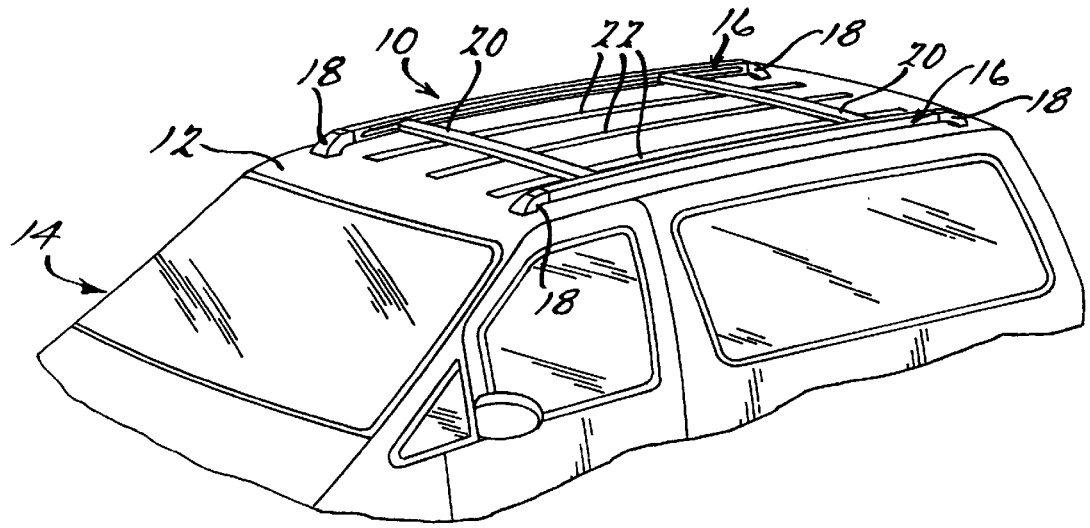
FIG. 1 is a perspective view of a vehicle including a vehicle article carrier apparatus in accordance with the preferred embodiment of the present invention.

Referring to FIG. 1 there is shown a vehicle article carrier 10 disposed on an outer body surface 12 of a vehicle 14. The vehicle article carrier 10 includes a pair of side rails 16 supported elevationally above the outer body surface 12 by a plurality of supports 18. Supports 18 are fixedly secured to the outer body surface 12 and to the side rails 16 such that the side rails are not able to be removed from the outer body surface 12. A pair of cross bars 20 are included but, however, it will be appreciated that a single cross bar 20 could be incorporated if desired. Both of the cross bars 20 are shown as being adjustably positionable along the side rails 16 but it will be appreciated that one or the other of the cross bars 20 could be fixedly secured to the side rails 16 so as to be immovable. Optionally, a plurality of intermediate slats 22 could be secured to the outer body surface 12 to further help protect this surface from contact with articles disposed on the cross bars 20.

Figure 2:
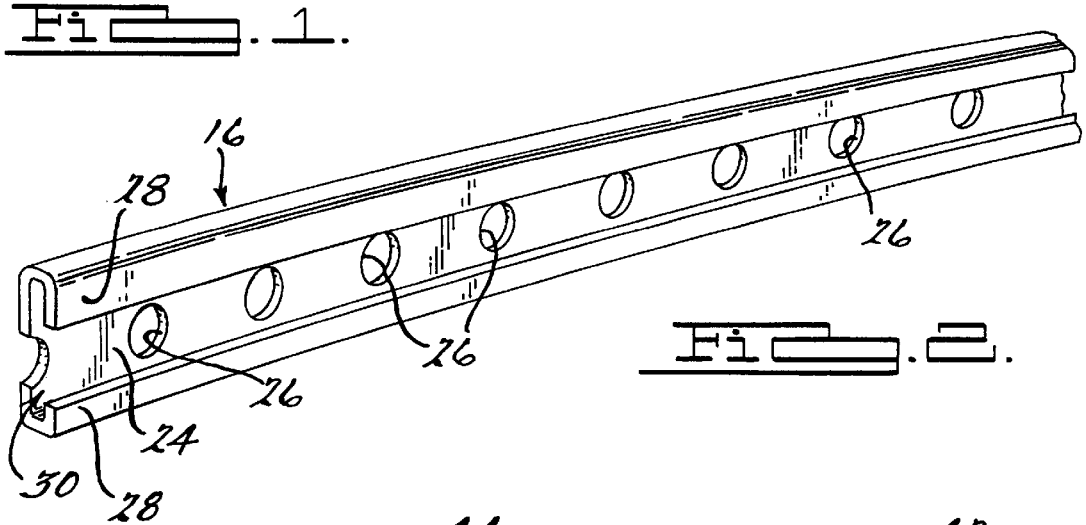
FIG. 2 is a perspective view of a portion of one of the side rails shown in FIG. 1.

Referring to FIG. 2, a portion of one of the side rails 16 is illustrated. The side rail 16 comprises a generally "C"-shaped length of material when viewed in cross section and has a bottom or end wall 24 having a plurality of spaced apart openings 26 formed therein. Openings 26 may extend entirely through the bottom wall 24 or may simply form recesses therein, provided the end wall 24 is of sufficient thickness. The openings 26 are spaced apart in pairs at predetermined intervals along the length of the side rail 16, the reason for which will become apparent from the description given in the following paragraphs. The side rail 16 is preferably made from a suitably rigid material such as steel or aluminum and includes a pair of ledges 28 which protrude toward one another. An interior area of the side rail 16 forms a channel, designated generally by reference numeral 30. Each of the side rails 16 are of identical construction and the channels 30 of each side rail 16 open towards each other.

Referring now to FIG. 3, the cross bar 20 generally comprises an elongated sleeve 32 having a first end portion 32a and a second end portion 32b, a first sleeve end member 34 and a second sleeve end member 36. A locking member composed of a first component 42 and an independent second component 44 are adapted to be partially slidably inserted within the sleeve 32 and moved relative to one another via an actuating member 46, the operation of which will be described greater in the following paragraphs. Biasing members 38 and 40 serve to bias each of the first and second components away from each other.

With further reference to FIG. 3, the first component 42 includes a camming portion 48, a neck portion 50 and a locking portion 52, all preferably formed from a single piece of material such as high strength plastic. The camming portion 48 forms a relatively thin, flat portion having a somewhat rectangular shaped opening 54. The opening 54 forms a camming surface 56. The neck portion 50 forms a generally U-shaped channel 58 within which the biasing member 38 may be placed. The locking portion 52 includes at least one, but preferably a pair, of protruding locking finger portions 60.

With further reference to FIG. 3, the second component 44 similarly has a camming portion 62 and a locking portion 64. The camming portion 62 forms a relatively thin section having a somewhat oval-shaped opening 66. The opening 66 forms a camming surface 68. The locking portion 64 includes at least one, and preferably a pair, of locking finger members 70.

FIG. 3 also illustrates the actuating member 46, which has a camming boss 72 extending generally perpendicularly therefrom and a manually graspable portion 74 forming a slightly up-turned lip. The camming boss 72 includes a bore 76 into which a conventional threaded fastening element 78 may be threadably inserted when the element 78 is placed through an aperture 32c in the sleeve 32. In this regard it will be appreciated that the sleeve also includes an opening 32d, as illustrated in phantom, which has a diameter just slightly larger than the overall width of the boss portion 76 to permit the boss portion to rotate freely within the opening 32d when the actuating member 46 is assembled to the sleeve 32.

Figure 4:
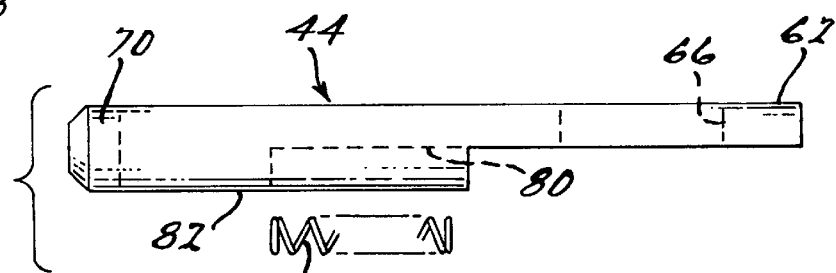
FIG. 4 is a side view of the second component of the locking member.
Figure 5:
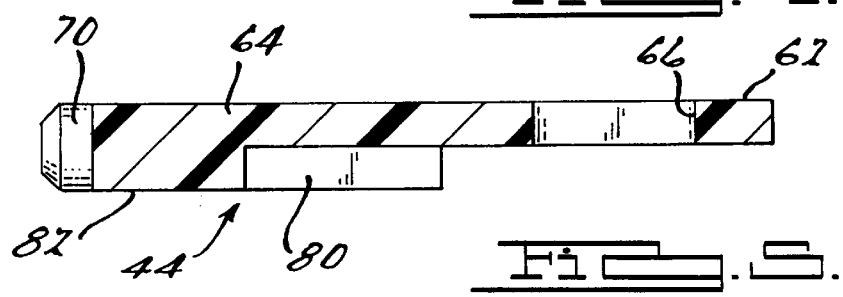
FIG. 5 is a cross sectional side view of the second component taken in accordance with section line 5—5 in FIG. 3.

With brief reference to FIGS. 4 and 5, the second component 44 is shown in greater detail. It will be noted that a cavity 80 is formed in an undersurface 82 of the component 44 for housing the biasing member 40 therein.

Referring briefly now to FIG. 6, the second sleeve end member 36 is shown. This member 36 includes an opening 84 having a cross-sectional shape substantially the same as the second component 44. The opening 84 also includes a shoulder portion 86 which is adapted to contact the biasing member 40 when the second component 44, the biasing member 40 and the sleeve end member 36 are assembled together. The shoulder portion 86 allows the biasing member 40 to exert a constant biasing force against the second component 44 to constantly urge this component outwardly of the sleeve end member 36.

Referring briefly now to FIG. 7, the sleeve end member 34 is shown in cross section. This component also includes an opening 88 which is shaped substantially in accordance with the locking portion 52 of the first component 42. An internal shoulder portion 90 is adapted to abut one end of the biasing member 38 when the biasing member is placed in the channel 58 and the component 42 is inserted through the sleeve end member 34 from end 34*a* thereof. When assembled, the shoulder portion 90 allows the biasing member 38 to exert a constant biasing force against the locking portion 52 to constantly bias the locking portion 52 outwardly thereof. Each of the sleeve end members 34 and 36 may be either press fit into ends 32*a* and 32*b* of the sleeve 32 or secured thereto by set screws.

With further reference to FIG. 3, it will be appreciated that the thickness of the camming portions 48 and 62 of the components 42 and 44, respectively, are such that they may be placed in overlapping relationship relative to one another and still be sufficiently thin, taken together, such that the boss portion 72 of the actuating member 46 is able to extend through both of portions 48 and 62. It will also be noted that camming surface 56 includes a notch 56*a*, while camming surface 68 includes a notch 68*a*. The purpose of these notches will be explained more fully momentarily.

With further reference to FIG. 3, the cross bar 20 is assembled by first inserting the sleeve end members 34 and 36 into the ends 32*a* and 32*b*, respectively, of the sleeve 32. The biasing member 38 is then placed in the channel 58 of the first component 42, and this component is then inserted through the sleeve end member 34 into the interior area of the sleeve 32. The biasing member 40 is then placed in the cavity 80 of the second component 44 and, while held there, the component 44 is inserted through the sleeve end member 36 into the end 32*b* of the sleeve 32. Because of the biasing force exerted by the biasing members 38 and 40, a slight compressive force needs to be exerted at each of the locking finger portions 60 and 70 to urge the components 42 and 44 inwardly relative to the sleeve 32 while the boss portion 72 of the actuating member 46 is inserted through the opening 32*d*, through the openings 54 and 66, and through opening 32*c*. The threaded member 78 can then be secured in the bore 76 of the boss portion 72 to hold the actuating member 46 pivotably to the sleeve 32.

Referring now to FIG. 8, the cross bar 20 is shown in the locked orientation. In this orientation, the locking finger members 60 engage one side rail 16 while the locking finger members 70 engage the opposite side rail 16. The finger members 60 and 70 engage within the openings 26 in each side rail 16 when longitudinally aligned with the openings 26. Thus, it will be appreciated that when the cross bar 20 is placed in the locked orientation, if the finger members 60 and 70 are not aligned with a pair of openings 26, a slight degree of further longitudinal movement of the cross bar 20 will be necessary until the finger portions 60 and 70 engage within a pair of the openings 26. As mentioned previously, it will also be appreciated that only a single locking finger portion could be used at each end of the cross bar 20 if desired. Using a pair at each end of the cross bar 20, however, further adds to the strength by which the cross bar 20 is held stationary at the desired position.

Referring briefly to FIG. 9, the orientation of the camming boss 72 relative to the camming portions 48 and 62 of the components 42 and 44, respectively, can be seen when the cross bar is in the locked orientation. The camming boss 72 is not engaged with either camming notch 56*a* or 68*a*.

Referring now to FIG. 10, the cross bar 20 is shown with the actuating member in the second or unlocked position. In this orientation, the camming boss 72 of the actuating member 46 has been rotated into the unlocked position, which involves rotating the actuating member 46 preferably about 30°–45° outwardly of the cross bar 20. The components 42 and 44 have been urged inwardly relative to the sleeve 32 against the biasing forces of biasing members 38 and 40, thereby causing the locking finger portions 60 and 70 to be withdrawn or retracted from the openings 26 and their respective side rails 16. In this position the cross bar 20 may be moved freely slidably along the side rails 16 and repositioned as needed. FIG. 11 also shows that the camming boss 72 has engaged within the notches 56*a* and 68*a* of the camming surfaces 56 and 66, respectively. Thus, the actuating member 46 may be released and it will be held in the second or unlocked position while the cross bar 20 is repositioned.

Referring now to FIG. 12, when the actuating member 46 is moved even further into a third position comprising a rotation of about 90° relative to the sleeve 32, the first and second components 42 and 44, respectively, are withdrawn inwardly relative to the sleeve 32 even further to the point where the entire cross bar 20 may be lifted completely outwardly of the channels 30 of the side rails 16. Thus, the cross bar 20 is able to be quickly and easily removed when it is anticipated that the vehicle article carrier will not be needed for some time.

The cross bar 20 thus forms a component of relatively simple construction having a relatively small number of independent component parts which can be quickly and easily unlocked from the side rails of a vehicle article carrier and repositioned as needed. The cross bar 20 provides the further advantage of being quickly and easily removable. Still further, locking and unlocking of the cross bar 20 is conveniently performed via a single actuating lever 46 from one side of the cross bar 20. Thus, there is no need for the user to first unlock one side of the cross bar than walk around to the opposite side of the vehicle before being able to reposition the cross bar as needed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus adapted to be disposed on an outer body surface of a vehicle for supporting articles above said outer body surface, said apparatus comprising:

a pair of side rails each having a channel and a plurality of spaced apart openings formed longitudinally along each said channel, each of said side rails being adapted to be secured to said outer body vehicle;

a cross bar adapted to be secured to said side rails for supporting articles thereon above said outer body surface, said cross bar including:

an elongated sleeve;

a locking member having first and second components movable relative to each other and to said side rails between locked and unlocked positions relative to said side rails;

each of said first and second components including a locking portion and a camming portion, each said camming portion having a camming surface;

an actuating member operably associated with said first and second components and movable between a first position and a second position, wherein in said first position said first and second components are engaged with at least one opening and an associated one of said channels, and when said actuating member is moved into said second position said first and second components are moved relative to each other into unlocked positions relative to their associated channels to thereby permit said cross bar to be moved slidably along said side rails; and wherein said actuating member includes a camming boss adapted to engage with said camming surfaces to simultaneously move said first and second components out of locking engagement with their associated channels when said actuating member is moved into said second position.

2. The apparatus of claim 1, further comprising a biasing member associated with said first component for urging said first component into said locked position relative to said channel associated with said first component.

3. The apparatus of claim 2, further comprising a biasing member operably associated with said second component for urging said second component into said locked position relative to said channel associated with said second component.

4. The apparatus of claim 1, wherein said camming portions each include an opening, and wherein said openings are disposed in overlapping relationship with one another when said first and second components are in said locked positions such that said camming boss extends through both of said openings in both of said camming portions.

5. The apparatus of claim 1, wherein said actuating member is movable into a release position wherein said cross bar is removable from said side rails.

6. A vehicle article carrier apparatus adapted to be disposed on an outer body surface of a vehicle for supporting articles above said outer body surface, said apparatus comprising:

a pair of side rails each having a channel and a plurality of spaced apart openings formed longitudinally therein along said channel, each of said side rails adapted to be secured to said outer body surface;

a cross bar adapted to be secured to said side rails for supporting articles thereon above said outer body surface, said cross bar including:

an elongated sleeve;

a locking apparatus having a first component and a second component, each of said first and second components having locking and camming portions and a biasing member, and each being adapted to reside at least partially within said elongated sleeve and to move slidably therewithin;

an actuating member movable between first and second positions and operably associated with said camming portions such that movement of said actuating member from said first position of said second position causes said camming portions to be cammingly urged longitudinally relative to said sleeve such that said locking portions are drawn out of locking engagement with their respective channels against a force of each said biasing member, and wherein movement of said actuating member back into said first position permits said biasing members to urge each of said components toward its associated side rail such that said locking portions engage with said openings to hold said cross bar stationary along said side rails.

7. The apparatus of claim 6, wherein each of said camming portions comprise an opening having a camming surface; and wherein said camming portions are disposed in overlapping relationship relative to one another within said sleeve; and wherein said actuating member includes a camming boss extending through said openings in said camming portions such that said camming boss cammingly urges said first and second components in opposite longitudinal directions when moved from said first position into said second position.

8. The apparatus of claim 6, wherein said actuating member comprises a lever pivotably mounted to said sleeve.

9. The apparatus of claim 6, further comprising a sleeve end member disposed at each end of said sleeve;

each sleeve end member housing one of said biasing members and including an internal shoulder portion against which its associated said biasing member contacts; and said first and second components each being movable slidably within an associated one of said sleeve end members.

10. The apparatus of claim 6, wherein each locking portion includes a pair of spaced apart, protruding locking portions.

11. A vehicle article carrier apparatus adapted to be disposed on an outer body surface of a vehicle for supporting articles above said outer body surface, said apparatus comprising:

a pair of side rails each having a channel and a plurality of spaced apart openings formed longitudinally within said channels, said side rails being adapted to be secured to said outer body surface;

a cross bar adapted to be secured to said side rails for supporting articles thereon above said outer body surface, said cross bar including:

an elongated sleeve;

a locking apparatus having a first component and a second component, each of said components having a locking portion and a camming portion and being movable slidably within at least a portion of said sleeve, each said locking portion being adapted to engage with at least one opening in an associated one of said channels when aligned therewith;

each said camming portion including an opening having a camming surface;

an actuating member movable between first, second and third positions and having a camming element adapted to engage said camming portions of said first and second components, wherein in said first position said locking portions are able to engage with at least one of said openings in each of said channels, and when said actuating member is moved into said second position said camming element cammingly urges said camming portions to simultaneously urge said locking portions out of locking engagement with said openings against a force provided by each biasing member; and when said actuating member is moved from said second position into said third position said locking portions are retracted away from said side rails sufficiently to permit said cross bar to be removed from said side rails.

12. The apparatus of claim 11, wherein said actuating member comprises a lever;

wherein said camming boss comprises bore; and wherein said actuating member is pivotably secured to said sleeve via an external threaded fastening element engaged within said bore.

13. The apparatus of claim 11, wherein said camming portions of said first and second components are adapted to reside in overlapping fashion and to move slidably relative to one another when said actuating member is moved from said first position into said second position.

14. The apparatus of claim 11, wherein each said locking portion comprises at least one spaced apart, protruding locking portion adapted to engage with a single one of said openings in an associated one of said channels.

15. A cross bar for a vehicle article carrier, where said vehicle article carrier includes a pair of side rails each having a channel, and wherein each said channel has a plurality of spaced apart openings formed longitudinally therealong, each of said side rails being adapted to be secured to an outer body surface of said vehicle and to support said cross bar above said outer body surface, said cross bar comprising:

an elongated sleeve;

a first component having a locking portion and a camming portion;

a second component having a locking portion and a camming portion;

an actuating member associated with said elongated sleeve and movable between first and second positions and having a camming element operably associated with said camming portions, said actuating member being operable to move said first and second components inwardly relative to said sleeve generally simultaneously when moved into said second position to thereby cause said locking portions to be drawn out of engagement with their respective said openings, to thereby enable said cross bar to be adjustably positioned along said side rails.

16. The cross bar of claim 15, wherein said actuating member is movable from said second position into a third position, wherein in said third position said locking portions are retracted sufficiently to permit said cross bar to be entirely removed from said side rails.

17. The cross bar of claim 15, further comprising at least one biasing member associated with one of said components for urging said one associated component into engagement with one of said openings in an associated one of said channels when said actuating member is in said first position.

18. The cross bar of claim 15, further comprising a pair of biasing members, each one of said biasing member being associated with one of said components for urging its associated said component into engagement with an opening in an associated one of said channels when said actuating member is in said first position.

* * * * *